June 16, 1942.  N. BARTLETT  2,286,454
AUTOMOBILE AMUSEMENT APPARATUS
Filed Sept. 14, 1939   8 Sheets-Sheet 1

INVENTOR
Norman Bartlett
BY
Bean, Brooks, Buckley & Bean.
ATTORNEYS

Fig. 3.

June 16, 1942. N. BARTLETT 2,286,454
AUTOMOBILE AMUSEMENT APPARATUS
Filed Sept. 14, 1939 8 Sheets-Sheet 2

INVENTOR
*Norman Bartlett*
BY
*Beau, Brooks, Buckley & Beau.*
ATTORNEYS

June 16, 1942.    N. BARTLETT    2,286,454
AUTOMOBILE AMUSEMENT APPARATUS
Filed Sept. 14, 1939    8 Sheets-Sheet 3

INVENTOR
Norman Bartlett
BY
Beau, Brooks, Buckley & Beau
ATTORNEYS

June 16, 1942.  N. BARTLETT  2,286,454
AUTOMOBILE AMUSEMENT APPARATUS
Filed Sept. 14, 1939  8 Sheets-Sheet 4

INVENTOR
Norman Bartlett
BY
Beau, Brooks, Buckley & Beau.
ATTORNEYS

June 16, 1942. N. BARTLETT 2,286,454
AUTOMOBILE AMUSEMENT APPARATUS
Filed Sept. 14, 1939 8 Sheets-Sheet 7

INVENTOR
Norman Bartlett
BY
Beau, Brooks, Buckley & Beau.
ATTORNEYS

Patented June 16, 1942

2,286,454

UNITED STATES PATENT OFFICE 2,286,454

AUTOMOBILE AMUSEMENT APPARATUS

Norman Bartlett, North Tonawanda, N. Y.

Application September 14, 1939, Serial No. 294,921

17 Claims. (Cl. 104—68)

The present invention relates to amusement apparatus and has particular relation to an automobile ride wherein cars, each adapted to contain one or more patrons, are controlled partly by the patrons and partly by the operator of the apparatus.

According to the present invention the cars are disposed upon and adapted to travel around a bowl which is mounted for rotation in the direction of travel of the cars, whereby the illusion of great speed is obtained by patrons in the cars and also by spectators, although the cars actually may travel at a safely slow speed with respect to the bowl.

Each car is provided with patron controlled steering gear and with propulsion means, preferably comprising a gasoline engine, having a patron operated accelerator control, and each car may also have means, remotely controlled by the operator of the ride independently of the patron-occupants of the cars, including a brake, means for rendering the patron-operated accelerator control ineffective, and means cooperating with the steering gear for urging the car toward the inside of the bowl.

Each car is also provided with speed control means in the form of a "supercharger" pump operable by one occupant of the car while another occupant steers, to enable the car to obtain maximum speed, thereby providing additional action and pleasure for the patrons. The "supercharger" pump may be associated with the accelerator or throttle control in such manner that a car can operate at a limited speed only when the pump is not operated. Preferably means are provided whereby the pump cannot be operated to produce its intended effect except by a patron seated beside the person who steers the car, thereby making it more attractive for two persons to occupy each car than one.

The invention contemplates that the remote control of the several cars by the operator of the amusement device may be through the instrumentality of an arm mounted for rotation above the cars substantially about the axis of the bowl, and means on each car engageable by the arm for effecting selective control in accordance with the direction of rotation of the arm at the time it engages the car carried means.

The invention further contemplates, as an alternative means of remote control by the amusement device operator, wireless or radio control, consisting of a transmitter controllable by the operator, a receiver on each car, and means on each car operable by the receiver to control the car.

These and other objects and advantages of the present invention, including the several novel arrangements and combinations of elements, will become apparent from the following description of the typical embodiments of the invention shown in the accompanying drawings, wherein:

Figure 1:
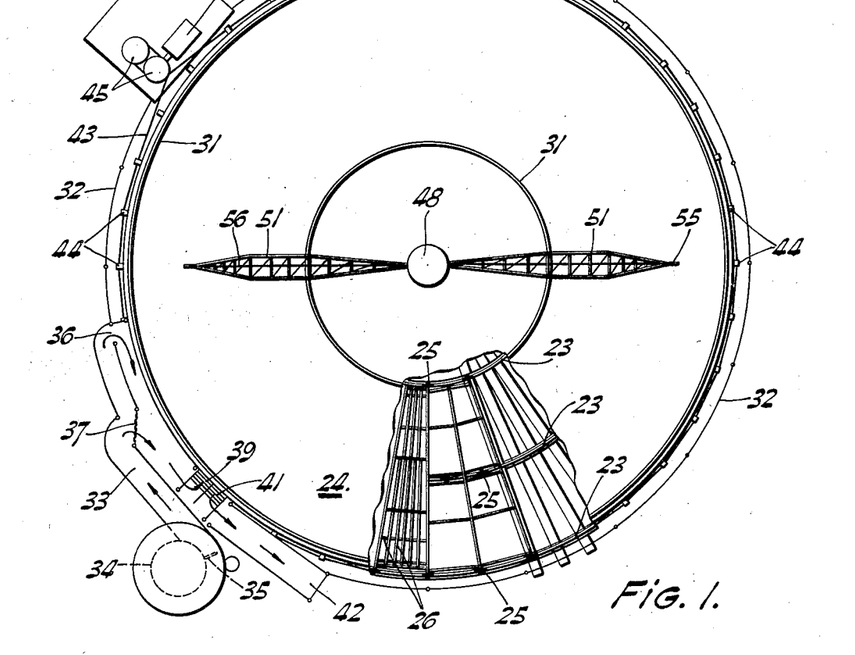
Fig. 1 is a plan view of the rotatable bowl and adjacent parts of the apparatus.
Figure 2:
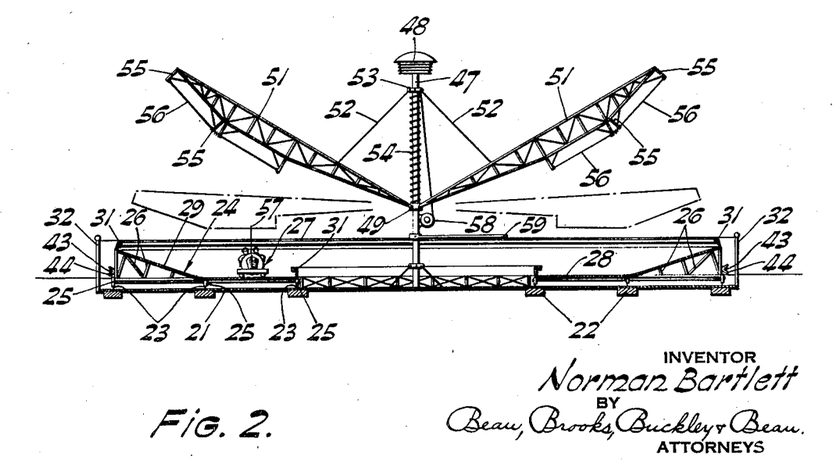
Fig. 2 is a vertical sectional view through the bowl, and showing one of the patron carrying cars disposed thereon.

As shown in Figs. 1 and 2, the amusement apparatus may include a base 21 supported upon suitable abutments 22, and carrying a plurality of concentric circular rails 23. A large bowl 24, concentric in plan, is supported by wheels 25 running on the rails 23 for rotation. The bowl may be built up of suitable metallic frame members 26, and covered with a suitable surfacing material upon which one or more cars 27 may operate. The inner portion of the surface of the bowl is substantially flat, as indicated at 28, while the outer surface portion is banked, as indicated at 29. Guard rails 31 are provided along the inner and outer circumferences of the bowl to prevent the cars from being driven off the bowl.

Around the bowl may extend a suitable fence 32, interrupted by a passenger or patron entering and exiting structure which may include a walkway 33 leading past an admission booth 34 and controlled by a gate 35, the walkway 33 opening at 36, and also through a gate 37 into platform 38 from which patrons may pass by stairs 39 to the bowl. The structure also includes exit stairs 41 leading to exit walkway 42.

A flexible drive cable 43 extends around the bowl, engaging in V recesses of bearing blocks 44 which are disposed at spaced intervals about the bowl, and also engaging driving drums 45 operated by a motor 46 through suitable reduction gearing. By this arrangement the bowl may be rotated at the desired speed, counterclockwise as the apparatus appears in Fig. 1.

Disposed centrally of the bowl is a rotatable upright 47 which may support a suitable illuminating device 48, and also supporting a collar 49 to which are pivoted arms 51 of truss formation. The arms are normally held in the position indicated by cables 52 secured to a collar 53. The latter is slidable on the upright, being retained normally in the position shown by spring 54. Depending from the arms are members 55 carrying tensioned wires 56.

A windlass 58, which may be motor operated if desired, is operable to lower the collar 53, against the resistance of spring 54, to lower the arms 51. The latter may be rotated by the operator of the apparatus as a unit with the windlass, collars 49 and 53, and the upright 47, by movement of a handle 59 which is secured to the upright.

By means of the windlass the arms may be lowered (to a position indicated by broken lines in Fig. 2) and then rotated in either direction to engage the tensioned wires 56 with a rod 57 which may be carried by each car, for control purposes to be hereinafter described.

Referring now to Figs. 3, 4, 5 and 11, each car 27 may be provided with an internal combustion engine 61, equipped with a carburetor 62 receiving fuel through line 63 from a fuel tank 64.

The drive shaft 66 of the engine is connected to one rear wheel of the car, 67, through a centrifugal clutch 68 which automatically disengages, interrupting the drive, when the engine operates at low speed; and through suitable reduction gearing contained within a housing 69.

The engine speed is controlled by a throttle valve having an operating link 65 so arranged as to open the throttle, increasing the engine speed, when moved toward the carburetor, and to close the throttle to a position wherein the engine idles when moved to its limit position in the opposite direction.

Link 65 extends through an eye 71 formed in the end of a lever 72, which is pivoted at 73 to a bracket 80 on the engine, and has a fork with diverging fingers 74 and 75 between which is a narrow recess 76. A nut 78 is adjustably secured upon the link 65 and the eye 71 is held in abutment with it by a coil spring 69 compressed on the end of the link by an adjusting nut 79.

Figure 3:
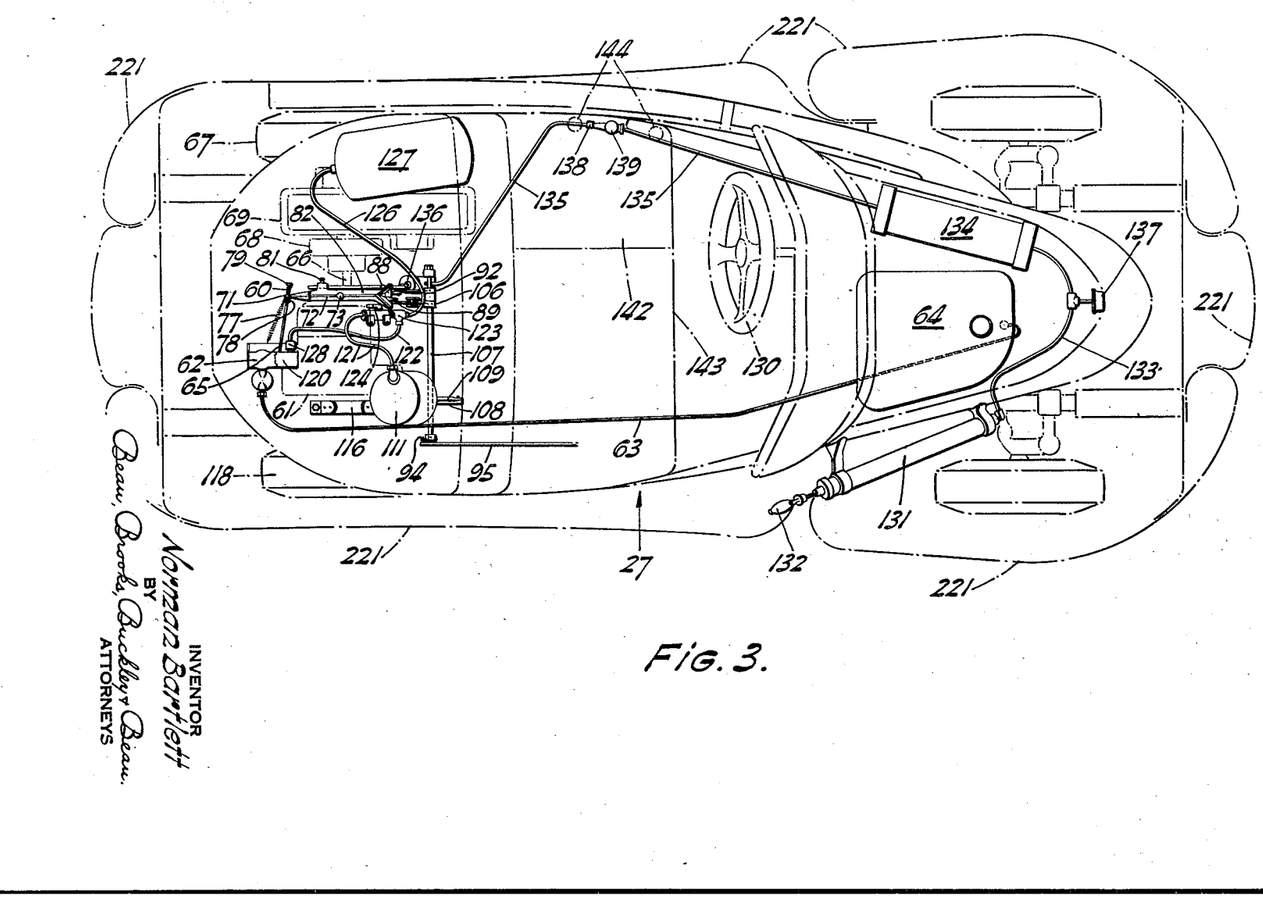
Fig. 3 is a phantom plan view showing the structure of one of the cars in broken lines, with certain of the control elements of the present invention shown in full lines.
Figure 4:
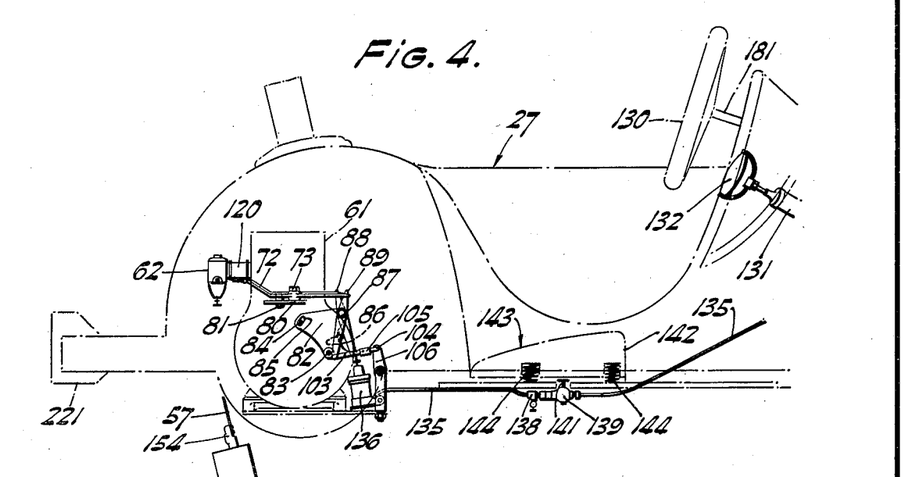
Figs. 4 and 5 are phantom side views of the car shown in Fig. 3, the car structure being shown in broken lines and certain of the control elements being shown in side elevation in full lines.
Figure 5:
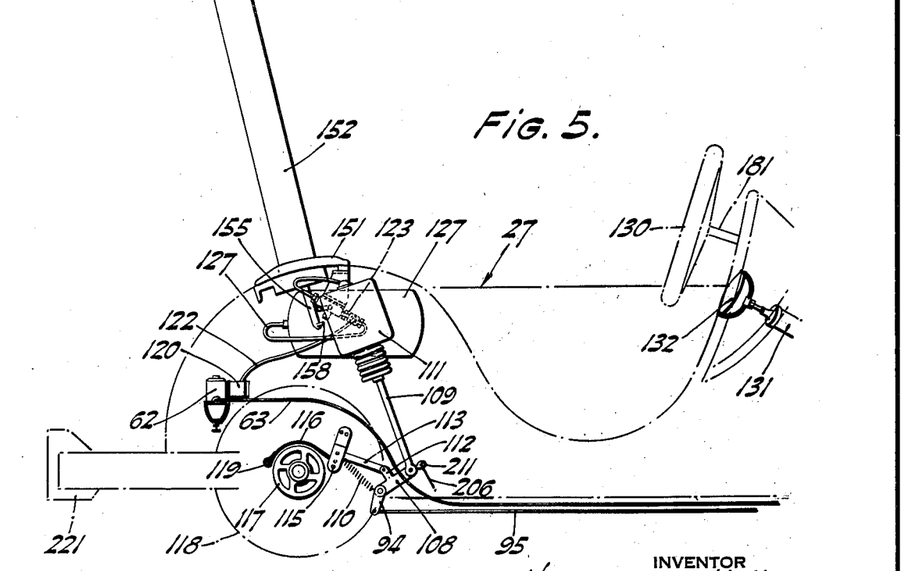

Another spring, 77, is tensioned between lever 72 and a stationary part of the car, for constantly urging the lever and link 65 to throttle opening position. As shown by Figs. 3 and 4 the lever 72 may have a stop 81 for abutment with bracket 80 to limit the maximum throttle opening movement of the lever.

A substantially upright plate 82 is pivoted at 83 to the engine or other stationary part of the car, its pivotal movement being guided by a stationary member 84 which extends through the arcuate slot 85 in the plate and being limited by an adjustable stop 86 which may abut against a part of the engine casing.

Pivoted at 87 to the plate 82 are levers 88 and 89, the upper end of lever 88 being engageable with the outer face of finger 74 of lever 72, and the upper end of lever 89 being engageable with the inner face of finger 75 of the lever or into the recess 76 between the fingers. The lower end of lever 88 is connected by link 91 to a crank arm 92 fixed on one end of a rod 93 on whose opposite end is another crank arm 94. The latter is connected by a link 95 to a crank 96 disposed beneath the floor board 101 of the car and against which abuts one arm 97 of a bell crank whose other arm, 98, carries an accelerator pedal 99 which extends through the floor board.

A spring 102 (Fig. 11), which may be tensioned between arm 96 and a stationary part of the car, normally urges the accelerator pedal and associated linkage to throttle closing position. When a patron in the car depresses the pedal it will be seen that cranks 96, 97, 94 and 92 will be turned clockwise, as viewed in Fig. 11, against the resistance of spring 102, and the link 91 will be shifted to move lever 88 counterclockwise. Such movement of the upper end of lever 88 will permit the spring 77 to shift lever 72, opening the engine throttle valve.

The lower end of lever 89 is pivoted to a link 103 that is connected to a link 104 by resilient means 105, link 104 being pivoted to a crank 106 secured to a tube 107 telescoped over rod 93, the tube being journaled for rotation in suitable supports on the car. Secured to tube 107 is a bell crank 108 to which is pivoted the piston rod 109 of a pneumatic cylinder 111. Connected to an arm 112 of the bell crank is a link 113 that is pivoted to a lever 114 which has a stationary pivot 115 carried by a suitable bracket on the car. Lever 114 is connected to a brake band 116 adapted to engage a brake drum 117 which is fixed for rotation with rear wheel 118 of the car. The brake band 116 may have a stationary anchorage or pivot 119 to a fixed part of the vehicle.

Cylinder 111 is connected by conduits 121 and 122 to the intake 120 of the engine, where a partial vacuum maintains when the engine is in operation. Interposed between the conduits 121 and 122 is a valve 123 which is operable by a lever 124 either to open communication between the conduits or to close conduit 122 and open conduit 121 to the atmosphere, through a vent opening 125. Leading from conduit 122 is a branch pipe 126 to a suction reservoir tank 127. A spring pressed check valve 128 is disposed in conduit 122, preferably close to, or at, the intake pipe, to close communication between the intake and conduit except when the degree of partial vacuum in the intake is substantial.

When the valve arm 124 is in a position closing communication between conduits 121 and 122, and opening the latter to the atmosphere through vent 125, thereby equalizing the pressure on both sides of the piston in cylinder 111, the piston rod 109 is caused to descend by action of spring 110 which may be connected between a fixed anchorage and lever 114, moving the latter and bell crank 108 clockwise about their respective axes of movement. This engages the brake band 116 with drum 117, and moves crank arm 106 clockwise, causing lever 89 to move counterclockwise. In this movement the upper end of lever 89 cams against finger 75 of lever 72, shifting the latter to a position wherein the engine throttle is closed to idling position, and enters the upper end of lever 89 in the recess 76, thereby latching lever 89 and the throttle in the idling position. When the lever 89 is so shifted and latched, its finger 74 is out of the path of motion of lever 88 whose movement is controlled by accelerator pedal 99, so that control of the throttle valve by a patron is removed.

Figure 11:
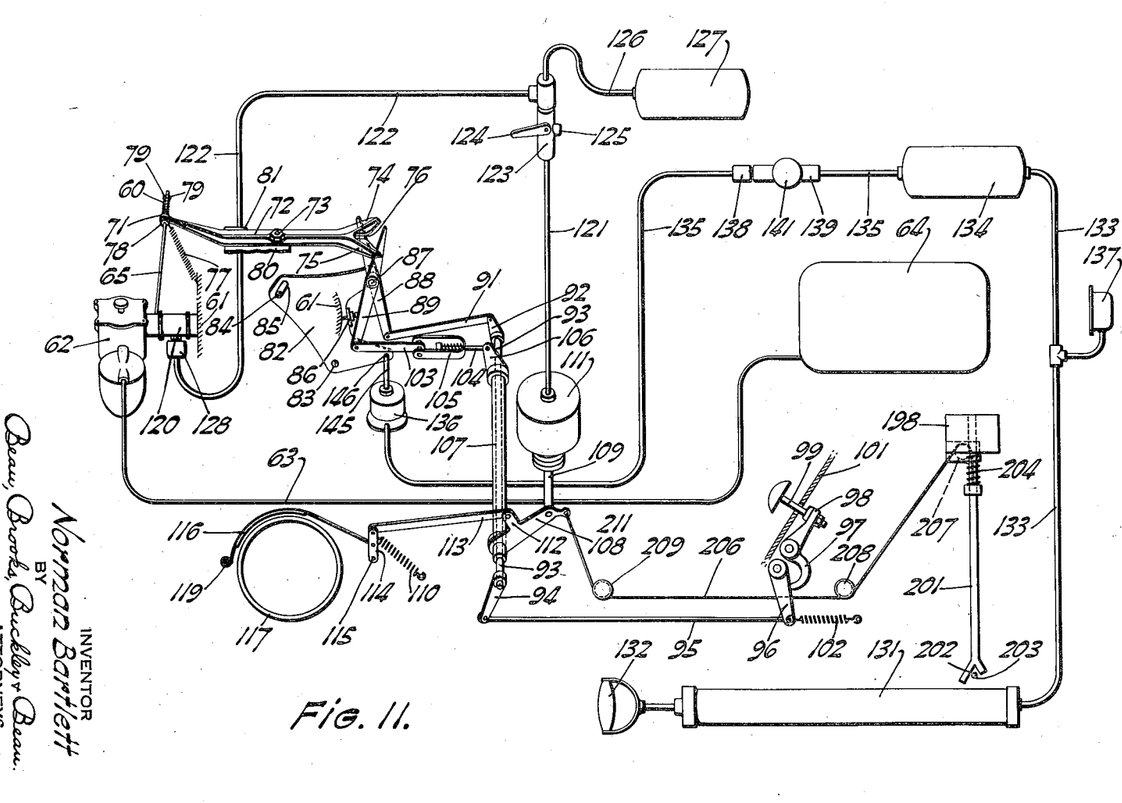
Fig. 11 is a diagrammatic perspective view schematically showing the car carried control apparatus.

When the valve arm 124 is in a position opening communication between conduits 121 and 122, and closing the atmospheric vent 125, the less-than-atmospheric pressure induced by the engine intake is caused to prevail above the piston in cylinder 111, thereby raising the piston and piston rod 109 to the position indicated in Fig. 11, releasing the brake band 116 from drum 117 and swinging the upper end of lever arm 89 forwardly (clockwise), removing it from recess 76 and from engagement with finger 75. Spring 77 is thereupon permitted to swing the lever 72 so that finger 74 bears against lever 88, thereby rendering the engine throttle valve subject to control by the patron through the means of accelerator pedal 99 and the associated linkage.

Secured to one side of the car, within convenient reach of a person seated beside the patron who is behind the steering wheel 130 is a "supercharger" air pump 131 with an operating handle 132. The outlet from the pump is through conduit 133 to an air reservoir tank 134, from which extends conduit 135 to an air cylinder 136. A small atmospheric vent is provided in the system between pump 131 and cylinder 136 so that nearly constant operation of the pump is required in order to maintain any substantial pressure in the system. The vent may be adjustable, consisting of a small vent valve 138 in conduit 135 as shown in Figs. 4 and 11. An air pressure gauge 137 may be connected to conduit 133, and mounted on the car within convenient view of occupants.

Controlling the passage of air through conduit 135 is a valve 139, controlled by a spring held plunger 141, the valve being open when the plunger is depressed, closed when the plunger is raised. Above and bearing upon the plunger is a separate section 142 of the car seat 143, the section 142 being partially supported by coiled springs 144, whereby when unoccupied the seat section 142 and plunger 141 will be so elevated that valve 139 will be closed. When a patron occupies seat section 142, the latter will depress plunger 141 opening the valve.

Air cylinder 136 has a piston with a piston rod 145 pivoted at 146 to the plate 82 which carries levers 88 and 89. When the air pressure provided by pump 131 is sufficient, the piston and the rod 146 which is secured to the piston are raised (against the resistance of a spring in cylinder 136 above the piston), thereby tilting the plate counterclockwise about its pivot 83. This movement carries the pivot 87 of levers 88 and 89 rearwardly (to the left in Fig. 11) thereby permitting further throttle opening movement of the lever 72 when the latter is controlled by lever 88, than is possible when there is no pressure in cylinder 136 and the pivot 87 is in a more forward position. By this arrangement the throttle can be most fully opened, to operate the car at maximum speed, only when the pump 131 is being operated by one patron and the seat section 142 is being occupied by another patron, so as to maintain pressure in the system connected to pump 131 and to open valve 139.

For controlling the valve 123, the mechanism shown in Figs. 5, 6, 7 and 8 may be employed. Mounted on the body of the car is a casting 151 supporting an upright tubular member 152. To the upper end of the latter is pivoted at 153 a lever 154 to which is secured the rod 57. To the free end of lever 154 is pivoted rod 155 which extends through member 152 and through an opening in a plate 156 secured beneath casting 151. At the lower end of rod 155 are spaced upper and lower abutments 157 and 158 which are disposed adjacent and in the plane of the operating arm 124 of valve 123, the latter being supported by a bracket 159 bolted to casting 151.

Secured by bolts 161 to upstanding ears 162 on plate 156 is a bridge member 163 to which is secured a tubular member 164. The latter extends about the rod 155 and has a ring 165 at its upper end which backs coiled springs 166 and 167 which also extend about rod 155. Spring 166, above ring 165, bears against a washer 168 held relative to the rod by pin 169, while the spring 167, below ring 165, bears against washer 171 that is held to the rod by pin 172.

Pivotally secured to plate 156 by bolts 173, and guided for pivotal movement by bolts 174, are blocks 175. These blocks have recesses 176 whose walls frictionally engage the rod 155 under the urge of a spring 177 which connects the two blocks.

In operation, forward movement of rod 57 (to the right in Figs. 5 and 6) will swing lever 154 to elevate rod 155 against the resistance of spring 167, causing finger 158 to engage and move clockwise the operating arm 124 of valve 123, effecting release of the car brake and causing the throttle valve of the engine to become controllable by the patron-occupant of the car through accelerator pedal 99.

Rearward movement of the rod 57 will depress rod 155 against the resistance of spring 166, causing finger 157 to engage the valve operating arm 124 and move it clockwise, thereby effecting application of the brake means, and moving the throttle valve to idling position.

During actuation of rod 155 the blocks 175 will serve as snubbers, preventing the rebound of the rod, by action of springs 166 and 167, from being of such large amplitude as to displace valve arm 124 from its operated position.

The steering mechanism of the car may be seen in Figs. 5, 9, 10 and 11 and includes the steering wheel 130 fixed to a rotatably mounted column 181 to the forward end of which is secured a drum 182. About the latter are wound several turns of flexible cable 183, the central turn of the cable preferably being anchored to the drum by extending therethrough as shown at 184 in Fig. 10. The cable extending from each side of the drum passes through a pulley block 185 anchored at 186 to one side of the car body, thence through a pulley block 187 connected to a medial portion of a tie rod 188, and the ends of the cable are joined by tensioning devices 189 to anchorages 186.

The ends of the tie rod are pivoted at 191 to right and left steering knuckle arms 192 and 193, respectively, which are pivoted by king pins 194 to stub axles 195 extending from the frame 196 of the car. As the steering wheel and column are turned by a patron, the cable 183 will cause tie rod 188 to shift laterally, thereby turning the front wheels 197 of the car which are mounted on spindles extending from the knuckle arms 192 and 193.

Mounted on the side rails of the car frame 196 are brackets 198 and 199 supporting a rod 201 for sliding longitudinal movement (transversely of the length of the car). The right end of the rod is provided with a fork 202 receiving a pin 203 which depends from steering knuckle arm 192 at a point spaced rearwardly from the king pin.

A coiled spring 204 is compressed between the bracket 198 and a block 205 secured to rod 201 movably urges the latter to the right, causing the fork 202 to engage the pin 203 and urge the knuckle arm to the right, tending to cause the car to turn left.

A flexible cable 206 having one end secured to block 205 extends around sheave 207, which is mounted on bracket 198 and around sheaves 208 and 209, its other end being connected to an extension 211 of bell crank 108.

When suction is maintained in cylinder 111, so that piston rod 109 is raised, the cable 206 is shifted, moving rod 201 to the left against the urge of spring 204, thereby relieving the steering mechanism of the tension urging the car to turn left, which tension otherwise exists.

In operation of the apparatus with two patrons seated in each car, the operator of the amusement ride may operate windlass 58 to lower arms 51 (to the broken line position of Fig. 2). He may then rotate handle 59 counterclockwise as the apparatus appears in plan, causing the arms 51 to rotate and sweep the wires 56 over the car carried rods 57. The latter, being moved forwardly, operate the mechanism shown in Fig. 6 to shift valve arm 124 on each car into the position wherein the valve 123 admits manifold suction to cylinder 111.

Thereupon the bell crank 108 is turned, counterclockwise as viewed in Fig. 11, resulting in cable 206 being pulled to free the steering mechanism from the turning influence of spring 204, in brake means 116, 117 being released, and in lever 89 being moved clear of lever 72, giving the patron-driver of the car control of the engine throttle valve.

The driver-patron in each car may now depress the accelerator pedal 99, speeding up the engine to such degree that the centrifugal clutch 68 will engage and the car will be propelled forwardly. The car's speed will depend, of course, upon the degree of accelerator pedal depression, and also, upon the degree of pressure which the passenger-patron maintains in the system including tank 134 and air cylinder 136 by operation of the "supercharger" pump 131, since only by maintaining considerable pressure will the plate 82 be swung so far rearwardly that the lever 74 carried thereby can permit maximum opening movement of the throttle valve linkage.

The cars are provided all around with spring bumpers 221 which prevent injury to patrons or cars due to collisions of the latter with each other or with the guard rails 31 around the bowl 24, these rails being of substantially the same height as the bumpers.

Either before or after the cars are in motion upon the bowl, rotation of the latter may be commenced by actuation of motor 46, increasing the speed of the cars relative to stationary objects, although not increasing the speed of the cars relative to each other or to the bowl upon which they operate. Due to the centrifugal force developed, the cars will ordinarily be driven by the patrons on the banked part of the track.

In order to stop the cars the operator of the amusement device rotates arms 51 in the opposite direction (first lowering them if they have been raised while the cars are operating), causing rods 57 to be swung rearwardly. This causes the valve 123 on each car to close conduit 122 from the cylinder 111 and to admit atmospheric air to the latter, permitting springs 110 and 204 to become effective, with the result that the accelerator pedals 99 of the cars become ineffective and the car engines idle and no longer drive; the brakes are applied; and the cars are steered left (toward the inner guard rail) by the spring 204. In this way the cars will ordinarily be standing on the inner part of the flat section 28 of the bowl when patrons are leaving and others are entering the cars.

While rotation of the bowl may be started and stopped either before or after the cars are in motion, it is preferred not to accelerate or decelerate the bowl while the cars are starting or stopping, as this results in additional drag on the car drive or brake mechanisms.

In the form of the invention shown in Figs. 12, 13 and 14 the structure of the bowl may be the same as that illustrated in and described in connection with Figs. 1 and 2 except that the rotatable arms 51 and the operating means therefor are eliminated, and in place thereof is substituted a radio impulse transmitter 251 having an antenna 252 for the purpose of transmitting impulses to receiving sets mounted on the cars 27 for controlling them.

Figures 6, 7, 8:
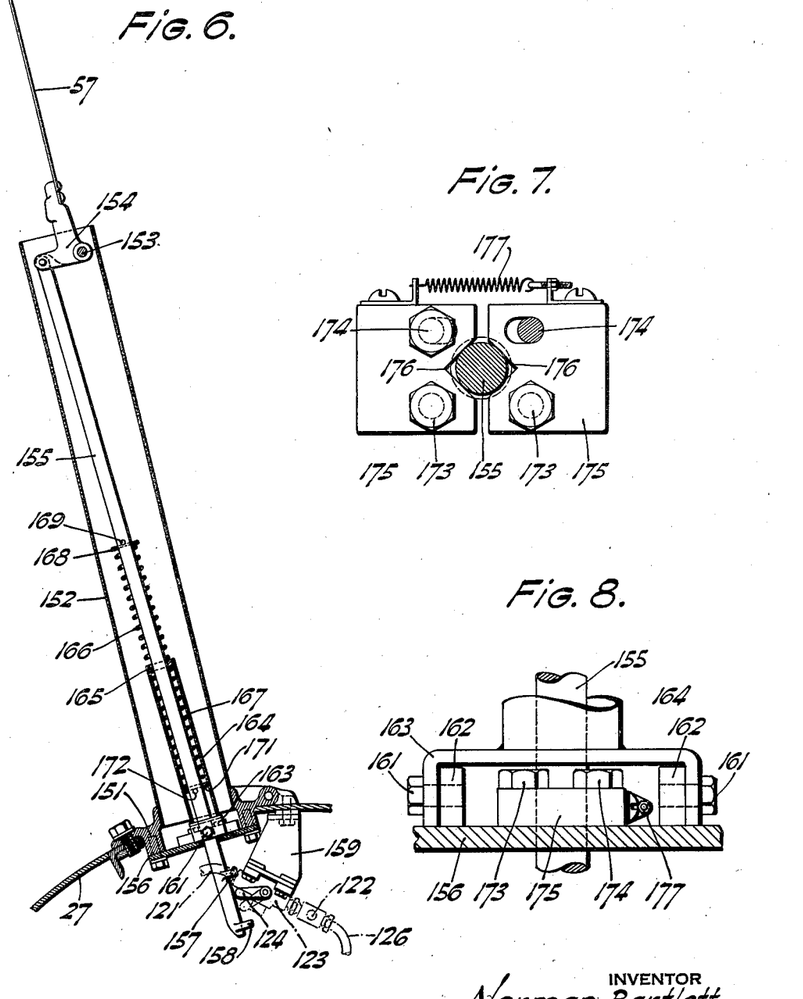
Fig. 6 is a detail vertical sectional view through the part of the car carried control mechanism that is engaged and operated by the rotatable overhead arms shown in Figs. 1 and 2.
Fig. 7 is a plan sectional view, to a larger scale, of a friction device associated with the apparatus shown in Fig. 6.
Fig. 8 is a vertical sectional view, at right angles to Fig. 6, showing a detail of the structure of the latter view.
Figure 9:
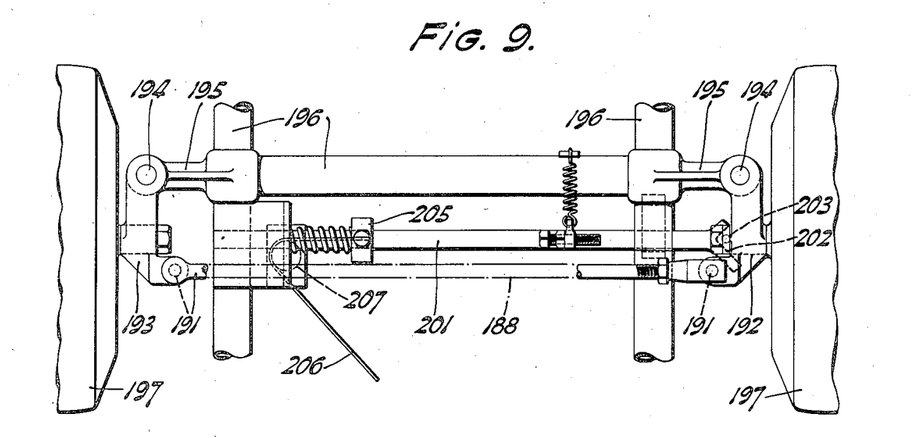
Fig. 9 is a plan view of the front part of the car structure including parts of the steering gear.
Figure 10:
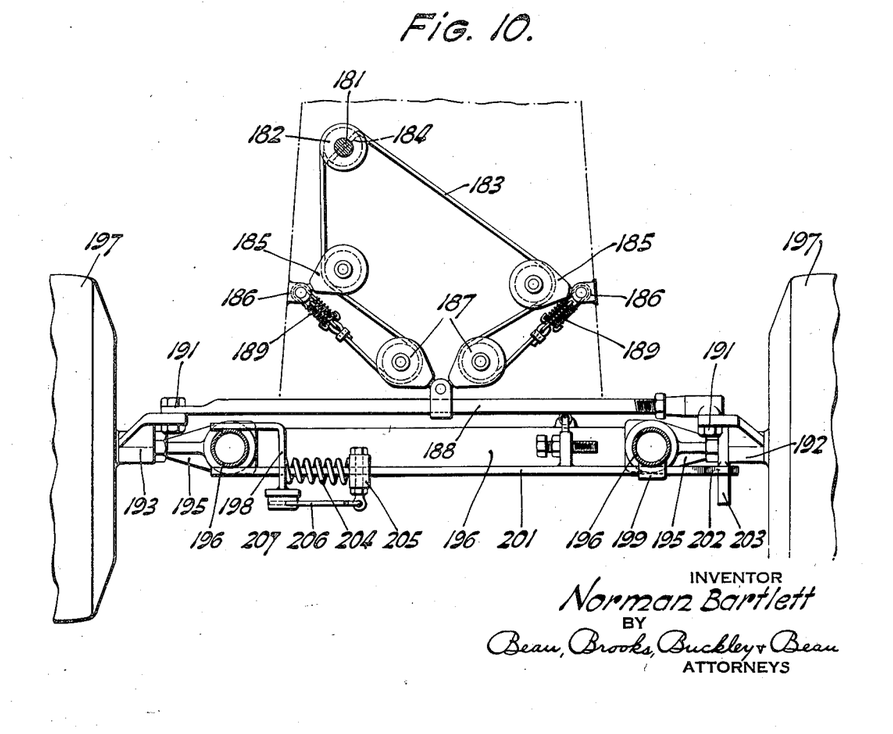
Fig. 10 is a vertical sectional view illustrating the structure shown in Fig. 9 and other parts of the steering gear.

The structure of the cars 27 may also be the same as that previously described, and the control means may be substantially the same as that illustrated in Fig. 11, but the mechanism shown in Figs. 6, 7 and 8, for operating valve 123, is eliminated. Instead, the apparatus illustrated in Figs. 13 and 14 and the receiving antenna 255 (Fig. 12) may be employed on the car to operate the valve 123.

Figure 13:
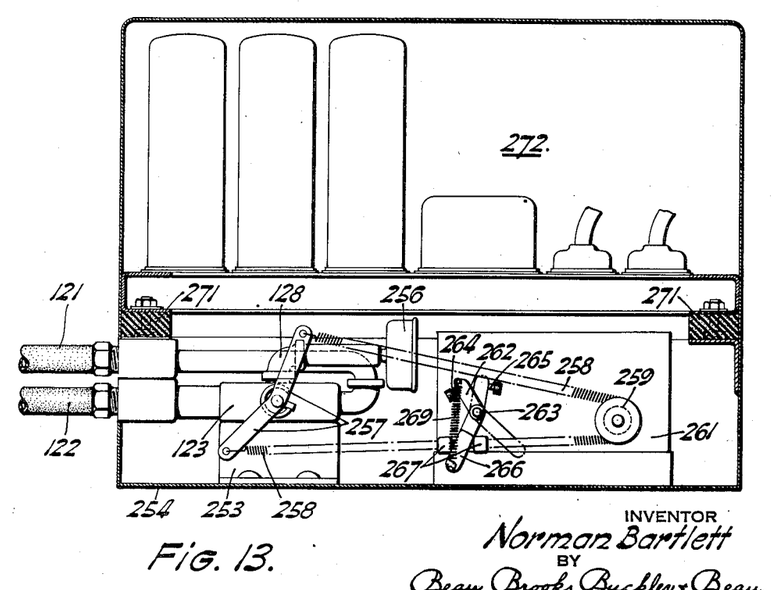
Fig. 13 is a vertical sectional view through the car carried casing containing the receiving means and motor operated valve actuating means operated thereby.

As shown in Fig. 13 the valve 123 is disposed between conduits 122 leading to the engine intake and conduit 121 leading to suction cylinder 111, and may be supported by a bracket 253 in a casing 254, the latter being mounted in the car preferably adjacent to the engine. As illustrated, an air cleaner 256 may be connected to the atmospheric vent 125 of the valve. The valve has oppositely extending operating arms 257 which are connected to the ends of a flexible belt 258, the medial portion of which extends over the drive pulley 259 of an electric motor 261 which is also mounted within casing 254.

Mounted on the motor casing is a toggle operated electric switch, including a switch arm 262 pivoted at 263 and capable of closing against either of two fixed contacts, 264 and 265. Also mounted on pivot 263 is arm 266 having a forked end engaging over belt 258 between two stops 267 carried by the belt. A tensioned spring 269 connects the free ends of arms 262 and 266.

When the valve arms 257 are moved by rotation of motor driven pulley 259 to their limit position of clockwise movement (as shown in Fig. 13) communication between conduits 121 and 122 is established and the atmospheric vent 125 is closed; and the switch arm 262 is held closed against contact 264 by spring 269. When the motor rotates pulley 259 counterclockwise the valve arms 257 are likewise moved clockwise to their limit position wherein conduit 122 is closed and conduit 121 is opened to the atmospheric vent 125. During this movement the arm 266 is moved to the right, and when the lower end of spring 269 has passed over the center of pivot 263 it will act to snap contact arm 262 away from contact 264 and into closed relation with contact 265.

Disposed above the motor in the casing 254, and preferably mounted on rubber pads 271 to absorb shocks, is a radio receiver 272, which is suitably connected to the antenna 255, and is tuned for the reception of impulses transmitted by transmitting apparatus 251, 252. The receiver 272 has in its output circuit a relay 273 which, together with the switch 262, 264, 265 controls the motor 261, effecting starting and stopping of the latter, and causing it to rotate oppositely during each succeeding operation.

Figures 12, 14:
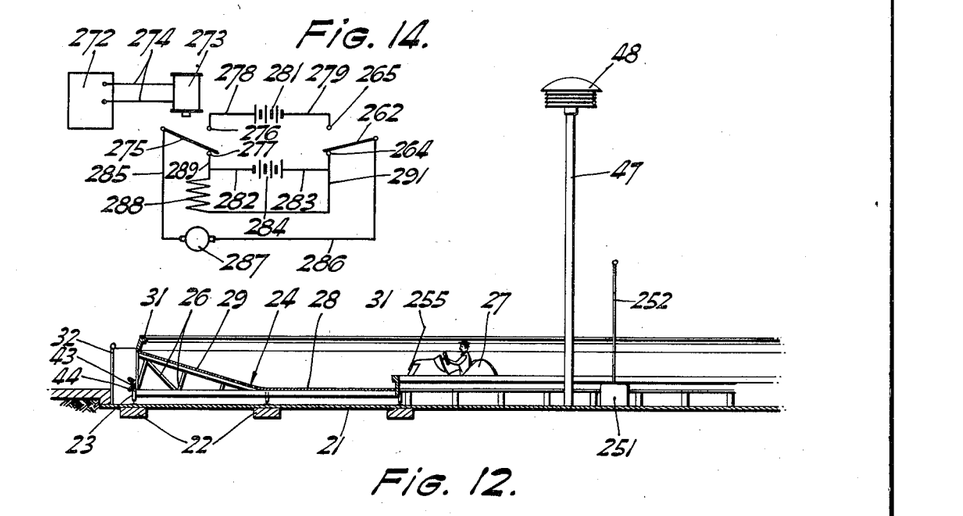
Fig. 12 is a vertical sectional view similar to Fig. 2, but of an alternative arrangement wherein the remote control is effected by wireless or radio transmitting and receiving means.
Fig. 14 is a diagram indicating one kind of electrical circuit which may be employed between the receiving means and the valve operating motor.

The circuit connections for the motor control may be as shown in Fig. 14, where a relay 273 is connected to lead wires 274, in the output circuit of receiver 272. The relay has an armature contact 275 which closes against a fixed contact 276 when the relay is energized and against a fixed contact 277 when the relay is de-energized. Connecting relay contact 276 with contact 265 of the toggle switch are wires 278 and 279 between which is connected a battery 281. Connecting relay contact 277 with contact 264 of the toggle switch are wires 282 and 283 between which is connected a battery 284 of reverse polarity from battery 281. Connected by wires 285 and 286 in circuit between relay armature contact 275 and toggle switch contact arm 262 may be the armature circuit 287 of the reversible motor 261. The field circuit 288 of the motor may be connected across battery 284 by wires 289 and 291.

Operation of the wireless control shown in Figs. 12, 13 and 14 is as follows: With the parts in the positions shown in Figs. 13 and 14 and the transmitter 251, 252 not operating, the receiver controlled relay 273 will be de-energized so that its armature 275 will be closed against contact 277. The motor armature circuit is therefore completed through battery 284 via wire 282, contact 277, armature bar 275, wire 285, motor armature circuit 287, wire 286, toggle switch arm 262, contact 264 and wire 283 to the battery. As the motor field circuit is also in closed circuit with the battery, the motor will operate counterclockwise, as the parts appear shown in Fig. 13, shifting the valve arms 257 counterclockwise, to a position closing communication between conduits 121 and 122 and open the atmospheric vent, thereby disabling patron control of the car, applying the brake, and urging the car to steer to the left, all as has been described hereinbefore in connection with the apparatus shown in Fig. 11.

Simultaneously with the valve 123 being moved to the position closing communication between conduits 121 and 122, the toggle switch arm 262 will be snapped away from contact 264 and against contact 265, thereby opening the motor armature circuit through battery 284, and causing the motor 261 to stop.

If the transmitter 251, 252 is now made operative to emit radio impulses, the latter will be received by the receiver 272 with the result that relay 273 will become energized, causing it to close its armature bar 275 against contact 276. As the toggle switch arm 262 is closed against contact 265, the motor armature circuit will now be closed through battery 281 via wire 279, contact 265, arm 262, wire 286, the motor armature circuit 287, wire 285, relay armature bar 225, contact 276 and wire 278 to the battery. Since the battery 281 is of reverse polarity from battery 284, the motor will now rotate oppositely clockwise as viewed in Fig. 13, moving the valve arms 257 to the position illustrated, and finally causing toggle switch arm 262 to snap away from contact 265 into closed relation to contact 264, thereby stopping the motor and conditioning the motor armature circuit for reverse operation of the motor upon the next de-energization of relay 273.

It will thus be understood that the operation of the amusement ride may, by simply causing the transmitter 251, 252 to operate or not operate, render the cars 27 steerable and subject to the control of patrons in the cars, or cause the cars to steer left (to the flat portion 28 of the track adjacent the inner rail 31), apply the brakes, and simultaneously disable patron control of the car engine throttles. The radio control is particularly effective when a plurality of cars 29 are employed since it results in all cars stopping and being enabled to start at the same time.

It will be understood further that the radio transmitter and receiver apparatus may be of any desired construction and circuit arrangement, it being sufficient that with such apparatus the relay 273, or an equivalent device, selective control of the car carried apparatus may be effected.

Figure 15:
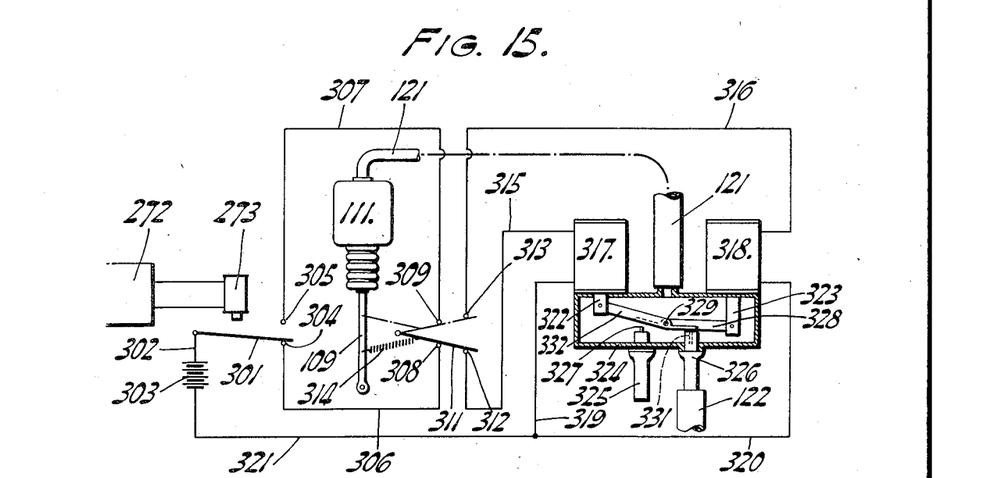
Fig. 15 is a view illustrating a modified valve arrangement and radio receiver controlled operating means therefor, portions of the arrangement being shown diagrammatically; and, Fig. 16 is a vertical sectional view similar to Figs. 2 and 12, but of a modified bowl structure.

For example, as shown in Fig. 15, the relay 273 controlled by radio receiver 272, instead of operating armature bar 275 shown in Fig. 14 and the apparatus thereby controlled, may operate an armature bar 301 connected by wire 302 to battery 303. When the relay 273 is de-energized armature bar 301 engages stationary contact 304 and when energized, engages stationary contact 305. These contacts are connected by wires 306 and 307, respectively, to stationary contacts 308 and 309 of a toggle switch whose pivoted contact element 311 is movable to a position closing contact 308 with another stationary contact 312, or to a position closing contact 309 with a stationary contact 313. The contact element may have an insulated connection to one end of a spring 314 whose other end is connected to the piston rod 109 associated with the pneumatic cylinder 111. This spring connection is such that the pivoted contact element 311 is snapped to a position closing contacts 308 and 312 when the piston rod 109 has descended to permit application of the brake of the vehicle and interruption of control of the engine throttle valve by the accelerator pedal 99; and such that the element 311 is snapped to a position closing contacts 309 and 313 when the piston rod 109 has ascended to release the brake and render the engine throttle valve operable by the accelerator pedal.

Connected to contacts 312 and 313 by wires 315 and 316, respectively, are the windings of solenoids 317 and 318, these windings being connected by wires 319, 320 and 321 to the other terminal of battery 303.

The solenoids 317 and 318 are mounted upon, and have their armatures 322 and 323 extending into, a casing 324 into which also extend a nipple 325 having one end open to the atmosphere and a nipple 326 which is connected, as for example, by the conduit 122, to the intake 120 of the engine 61. The chamber within casing 324 is also connected to the cylinder 111, as for example, by the conduit 121. Controlling the opening of the nipple 325 into the interior of the casing is a valve, which may be an automotive pneumatic tire valve, having a stem 327 engageable by one end of a lever 328, pivoted within the casing at 329 and whose other end is pivoted to armature 323.

Controlling the opening of nipple 326 into the casing is a similar valve having a stem 331 engageable by one end of a lever 332 whose other end is pivoted to armature 322, and which is also mounted upon pivot 329.

In the condition of the apparatus shown in Fig. 15, operation of the radio transmitter 251, 252 has just been discontinued, so that receiver controlled relay 273 has been de-energized, dropping armature 301 against contact 304, thereby closing the circuit through solenoid 317, via: from battery 303, wire 302, armature 301, contact 304, wire 306, fixed contact 308, movable contact 311, fixed contact 312, wire 315, windings of solenoid 317, wire 319, and by wire 321 return to battery 303.

The result has been that the solenoid has retracted its armature, swinging lever 332 into a position depressing (opening) valve stem 331, permitting air to be withdrawn from cylinder 111 through conduit 121, the chamber of casing 324 and conduit 122 into the engine intake. This will quickly result in the piston rod 109 being raised, releasing the brake of the vehicle and rendering the engine throttle operable by the accelerator pedal, as has been described heretofore, and also snapping pivoted contact 311 to its upper or dotted line position whereby the circuit of solenoid 317 is broken across contacts 308 and 312. As a result the armature 322 may descend by gravity, allowing the valve in nipple 326 to close, but the vacuous condition maintaining in cylinder 111 will retain the piston rod 109 raised so long as the transmitter 251 remains inoperative.

If the radio transmitter is now operated, to cause the receiver 272 to energize relay 273, armature 301 will close against contact 305, thereby energizing the solenoid 318 through the following circuit: from battery 303, wire 302, armature 301, contact 305, wire 307, contact 309, movable contact 311, contact 313, wire 316, the windings of solenoid 318, wire 320, and by wire 321 return to the battery 303. The result will be raising of armature 323 and depression of valve stem 327, thereby admitting air into casing 324 and dissipation of the partial vacuum in cylinder 111. Piston rod 109 will thereupon descend, causing application of the vehicle brake and dissociation of the accelerator pedal from the engine throttle valve.

Now upon de-energization of solenoid 273 the operating condition shown in Fig. 15 will again prevail.

Figure 16:
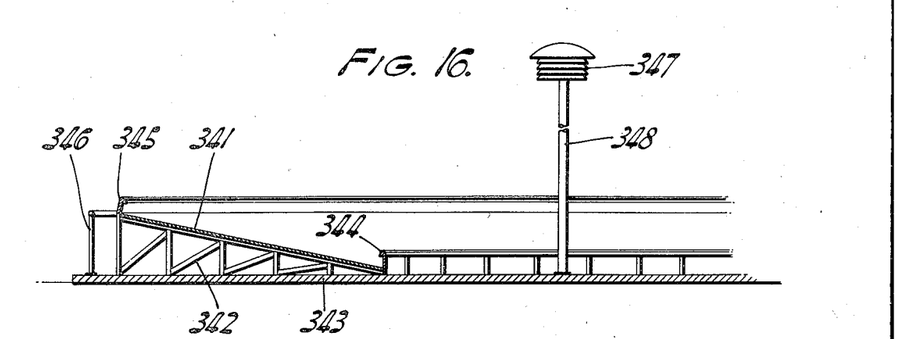

In Fig. 16 is illustrated a stationary bowl 341 supported upon frame members 342 resting upon a foundation pad 343. Around the inner and outer edges of the bowl are guard rails 344 and 345, respectively, and around the entire structure is a fence 346. Illuminating means 347 supported upon a standard 348 may be disposed centrally of the bowl. It will be understood that the cars of the present invention, and any of the control means therefor disclosed herein, may be employed in association with such a stationary bowl as well as with the rotatable bowls described in connection with Figs. 1, 2 and 12.

It will be understood still further that the apparatus herein shown and described is merely illustrative of the embodiments of the inventive principles involved and that these principles may be otherwise embodied without departing from the spirit of the invention or the scope of the appended claims.

I claim:

1. In apparatus of the class described, a track having an inner substantially flat portion and an outer banked portion, a self-propelled passenger carrying car adapted to travel on said bowl and having steering means and braking means thereon, control means effective for urging the steering means to cause the car to steer toward said inner portion of the track and for applying said braking means, and means remote from the car operable to render said control means effective and ineffective.

2. In apparatus of the class described, a bowl having an inner substantially flat track portion and an outer banked track portion, self-propelled cars adapted to travel on said track portions, each of said cars having a passenger controlled steering gear, spring means cooperating with the steering gear for urging the car to turn toward said flat track portion, car drive means having a speed control and passenger actuated means for operating said speed control, braking means, fluid pressure means on each car for rendering the braking means and said spring means ineffective or for rendering the braking means and said spring means effective and for disabling the passenger actuated means for operating the speed control, and means operable outside of said cars for selectively controlling the fluid pressure means of the cars.

3. In apparatus of the class described, a track having an inner substantially flat track portion and an outer banked track portion, self-propelled passenger carrying cars adapted to travel on said track portions, each of said cars having passenger controlled steering means and spring means associated therewith for urging the cars to turn toward said inner substantially flat track portion; selectively controllable fluid pressure means for rendering said spring means effective or ineffective, and means operable outside of said cars for selectively controlling said fluid pressure means.

4. In apparatus of the class described, a continuous track having an inner substantially flat track portion and an outer banked track portion, self-propelled cars running on said track portions, each of the cars having passenger controlled steering means and spring means associated therewith for urging the cars to turn toward said inner substantially flat track portion; means on each car including fluid pressure means selectively controllable by a valve for rendering said spring means effective or ineffective, a motor for operating said valve, a relay for controlling the motor, and a radio receiver for operating the relay; and a radio transmitter disposed substantially centrally of the track for controlling the relays on the cars through impulses transmitted to the radio receivers.

5. In apparatus of the class described, a continuous track having an inner substantially flat track portion and an outer banked track portion, self-propelled cars running on said track portions, each of the cars having passenger controlled steering means and spring means associated therewith for urging the cars to turn toward said inner substantially flat track portion, means on each car including fluid pressure means selectively controllable by a valve for rendering said spring means effective or ineffective, a rod extending above the car and adapted for forward or rearward movement, and means for actuating the valve in accordance with the direction of movement of said rod; and an arm pivoted substantially centrally of the track, extending radially over said track portions, and rotatable in either direction about its pivot to effect forward or rearward movement of the rods for actuating the valves on the cars.

6. In apparatus of the class described, a car having a steering gear operable by an occupant, resilient means engageable with the steering gear for tending to turn the car in one direction, fluid pressure means for controlling engagement of the resilient means with the steering gear, and means outside of the car for controlling the operation of said fluid pressure means.

7. In apparatus of the class described, a car having a steering gear operable by an occupant, means normally disengaged from the steering gear and engageable therewith for urging the latter to turn the car in one direction, and means controllable from outside of the car for rendering the last mentioned means effective or ineffective.

8. In apparatus of the class described, a car having a passenger operated steering gear including a steering knuckle arm, a spring pressed element engaging said arm at a point spaced from the pin for urging turning movement of the arm, and means controlled from outside of the car and connected to said element for removing it from engagement with the arm for relieving the turning urge.

9. In apparatus of the class described, an upright, a circular track substantially concentric to said upright, cars on said track having a control rod extending upwardly therefrom and adapted for forward and rearward movement to control the cars, an arm supported on said upright and extending radially over the track, said arm being adapted to be lowered and rotated about the axis of said upright into operating engagement with the control rods of the cars.

10. In apparatus of the class described, a car having an engine with a throttle valve, and a drive operated by the engine including a clutch automatically engageable when the engine operates above a predetermined speed, means operable by an occupant of the car for opening or closing said throttle valve to increase the speed of the engine, means controllable from outside of the car for disabling said means operable by an occupant of the car, movable means for limiting maximum opening of the throttle, and means operable by another occupant of the car for effecting movement of the limiting means to enable maximum opening of the throttle.

11. In apparatus of the class described, a car having a speed control element and a member operable by an occupant for operating said element, means operable from outside of the car for preventing said member from operating the control element, movable means for limiting movement of said speed control element by said member, and pump means operable by another occupant of the car for moving the movable means to enable the first mentioned occupant to operate the car at maximum speed.

12. In apparatus of the class described, a car having an engine throttle, and having a drive operated by said engine including a clutch automatically engageable when the engine operates above a predetermined speed, means operable by an occupant of the car for controlling the throttle to increase or decrease the engine speed, means for disabling the last mentioned means and causing the throttle to close, a fluid pressure device for controlling the disabling means, solenoid operated valve means for controlling the fluid pressure device, and switch means operable by cooperation of said fluid pressure device and a radio receiver for controlling the solenoid means.

13. In apparatus of the class described, a car having a speed control element movable by an occupant, movable means limiting movement of said element to limit the speed of the car to less than its maximum speed, and means operable by another occupant of the car and requiring substantially continuous operation by said another occupant for shifting said movable means to enable the first mentioned occupant to operate the car at maximum speed.

14. In apparatus of the class described, a car having a speed control element movable by one occupant, means limiting movement of said element to limit the maximum speed of the car, pressure operated means for moving the limiting means to a position enabling maximum speed, and a pump operable by another occupant of the car for maintaining operating pressure for said pressure operated means, the pump requiring frequent actuation by said another occupant in order to maintain said operating pressure.

15. In apparatus of the class described, a car having a speed control element movable by one occupant, means limiting movement of said element to limit the maximum speed of the car, pressure operated means for moving the limiting means to a position enabling maximum speed, and a pump operable by another occupant of the car for creating operating pressure for said pressure operated means, and valve means effective when the car is loaded to less than capacity for preventing operation of said pressure operated means.

16. In apparatus of the class described, a car having a speed control element movable by one occupant to increase the speed of the car, means positioned on the car to be operable by a second occupant and requiring operation by said second occupant in order to permit movement of said control element to a position of maximum speed, and means requiring the presence of two occupants in the car to enable the first mentioned means to function.

17. In apparatus of the class described, a car having a speed control element movable by one occupant to increase the speed of the car, means for limiting movement of said element to a position wherein the car can operate at a speed less than its maximum speed, and means requiring the presence of a second occupant in the car for rendering said limiting means inoperative.

NORMAN BARTLETT.